(12) United States Patent
Boehm et al.

(10) Patent No.: US 7,318,342 B2
(45) Date of Patent: Jan. 15, 2008

(54) METHOD FOR MODEL-BASED DETERMINATION OF THE FRESH AIR MASS FLOWING INTO THE CYLINDER COMBUSTION CHAMBER OF AN INTERNAL COMBUSTION ENGINE DURING AN INTAKE PHASE

(75) Inventors: Martin Boehm, Munich (DE); Heiko Konrad, Baierbrunn (DE); Satish Patel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/710,943

(22) Filed: Feb. 27, 2007

(65) Prior Publication Data

US 2007/0157715 A1 Jul. 12, 2007

Related U.S. Application Data

(63) Continuation of application No. PCT/EP2005/008922, filed on Aug. 17, 2005.

(30) Foreign Application Priority Data

Aug. 28, 2004 (DE) .................. 10 2004 041 708

(51) Int. Cl.
*G01M 15/00* (2006.01)
(52) U.S. Cl. ..................................... 73/118.2
(58) Field of Classification Search ............. 73/112, 73/115, 116, 117.2, 117.3, 118.1, 118.2; 701/29
See application file for complete search history.

(56) References Cited

U.S. PATENT DOCUMENTS 5,889,205 A * 3/1999 Treinies et al. ............ 73/118.2

| 5,974,870 | A | * | 11/1999 | Treinies et al. ............ 73/118.2 |
| 6,367,319 | B2 | | 4/2002 | Hartke et al. |
| 6,782,738 | B2 | | 8/2004 | Rouphael |
| 6,805,095 | B2 | | 10/2004 | Sun et al. |
| 6,990,957 | B2 | | 1/2006 | Dingl et al. |

(Continued)

FOREIGN PATENT DOCUMENTS

DE   197 55 919 A1   10/1998

(Continued)

OTHER PUBLICATIONS

International Search Report dated Dec. 16, 2005 with an English translation of the pertinent portions (Six (6) pages).

(Continued)

*Primary Examiner*—Eric S. McCall
(74) *Attorney, Agent, or Firm*—Crowell & Moring LLP

(57) ABSTRACT

A method for model-based determination of the total fresh air mass flowing into the cylinder combustion chamber of an internal combustion engine during an intake phase is described. The method includes, steps of ascertaining a first partial air mass on the basis of a first load partial model, the first load partial model having a linear behavior, ascertaining a second partial air mass on the basis of a second load partial model, the second load partial model having a nonlinear behavior, and determining the total air mass by adding together the previously ascertained partial air masses.

20 Claims, 3 Drawing Sheets

U.S. PATENT DOCUMENTS

2004/0084015 A1    5/2004   Sun et al.
2005/0246090 A1*  11/2005   Dingl et al. ................ 701/102

FOREIGN PATENT DOCUMENTS

| DE | 197 66 919 A1 | 10/1998 |
| DE | 197 53 873 A1 | 5/1999 |
| DE | 197 53 873 A1 | 6/1999 |
| DE | 198 44 085 C1 | 3/2000 |
| DE | 101 58 247 A1 | 7/2003 |
| DE | 103 11 313 A1 | 10/2003 |
| DE | 103 49 490 A1 | 8/2004 |
| DE | 103 16 291 B3 | 11/2004 |
| WO | WO 97/36106 A2 | 9/1997 |

OTHER PUBLICATIONS

German Examination Report dated Apr. 21, 2005 with an English translation of the pertinent portions (Five (5) pages).

* cited by examiner

METHOD FOR MODEL-BASED DETERMINATION OF THE FRESH AIR MASS FLOWING INTO THE CYLINDER COMBUSTION CHAMBER OF AN INTERNAL COMBUSTION ENGINE DURING AN INTAKE PHASE

CROSS REFERENCE TO RELATED APPLICATIONS

This application is a continuation of PCT International Application No. PCT/EP2005/008922, filed Aug. 17, 2005, which claims priority under 35 U.S.C. § 119 to German Patent Application No. 10 2004 041 708.3 filed Aug. 28, 2004, the entire disclosures of which are herein expressly incorporated by reference.

BACKGROUND AND SUMMARY OF THE INVENTION

The present invention relates to a method for model-based determination of the fresh air mass flowing into the cylinder combustion chamber of an internal combustion engine during an intake phase. The total fresh air quantity present in the combustion chamber after termination of the intake phase may subsequently be calculated on the basis of the ascertained fresh air mass flowing into the cylinder combustion chamber.

When controlling internal combustion engines, particularly when controlling gasoline engines for motor vehicles, precise knowledge of the air mass flowing into the cylinder combustion chamber(s), and/or of the air mass present in the combustion chamber after termination of the intake phase, plays a decisive role. This is because important variables such as injection duration and ignition angle are calculated on the basis of the air mass (load) present in the combustion chamber after termination of the intake phase. Errors in the load signal rapidly result in emission, consumption, and drivability problems. Because in practice there are typically no sensors for direct measurement of the air mass flow at the intake manifold outlet, at the transition to the cylinder inlet, load models in which the load is calculated on the basis of other existing measured variables, are typically used. Such load models must be very precise, in particular if there is no air mass sensor (e.g., HFM sensor) in the entire intake system, on the basis of whose measured values possible model errors may be regulated out using a regulator. In load modeling, the air mass flowing into the cylinder is usually used as a function of the pressure in the intake manifold and further parameters such as speed of the internal combustion engine, position of the camshaft, temperatures inside the intake-combustion-exhaust path, and/or the exhaust gas counter pressure. A linear model, in which the load rises linearly with the intake manifold pressure (linear model) is frequently used for the description of the dependence of the load on the existing intake manifold pressure. The position of the straight lines is determined by the remaining input variables described above.

In model-based load acquisition, the load signal is typically calculated online in the engine controller using the existing load model from a value of the intake manifold pressure. The required intake manifold pressure may be measured or may also be ascertained based on a model.

In addition to the load acquisition, the load model is also used for the load controller. In the load controller, the setpoint intake manifold pressure is calculated from the load setpoint value, which is predefined from the torque structure (by the driver command). In the case of a linear load model, this is possible without problems because of the ability to simply invert linear functions. The setpoint intake manifold pressure is used (if necessary together with the load setpoint value and a possibly existing tank ventilation mass flow) for calculating the throttle valve setpoint position (throttled operation) and/or for calculating the gas exchange valve control times and/or stroke paths (unthrottled operation). If setpoint value and actual value of the intake manifold pressure correspond, because of the ability to invert the linear load model, load actual value and load setpoint value (filling actual value and filling setpoint value) are equal. This is a necessary condition for the functioning of the torque structure.

From the findings described, it results as a requirement for the use of a linear load model for determining and controlling the load, that the cylinder filling actually rise linearly with the intake manifold pressure. Particularly in turbocharged, direct-injection internal combustion engines, a linear relationship between intake manifold pressure and load does not occur over the entire pressure range. In these engines, the load rises disproportionally with increasing "unthrottling" (via throttle valve and/or via gas exchange valve strokes or gas exchange valve control times). Furthermore, in turbocharged, direct-injection internal combustion engines, overflow of the fresh air intake is intentionally caused at some operating points, such that fresh air is directed uncombusted from the intake manifold into the exhaust gas system during the intake phase. The goal of this being to increase the air-mass flow and achieve a more favorable operating point of the turbocharger. In the case when overflow is used, the fresh air mass intake is therefore unequal to the fresh air mass remaining in the cylinder combustion chamber after termination of the intake phase.

Therefore, a differentiation is made in the following in the meaning of the present invention, and within the scope of this disclosure "load" refers to the fresh air mass located in the cylinder after termination of the intake phase, and "fresh air mass intake" refers to the entire air mass taken in during the intake phase.

Both the nonlinear increase of the load and also the overflow of the fresh air mass intake may not be taken into consideration adequately using a linear load model. Especially in turbocharged, direct-injection internal combustion engines, large modeling errors, which must be regulated out permanently on the basis of an air mass meter and a regulator, result if a linear model is used for ascertaining the fresh air intake or for ascertaining the load. Operation without an air mass meter is therefore not possible using a linear model. The use of air mass measuring units in turbocharged internal combustion engines is problematic, however, since situating the measuring units is extremely difficult. If the measuring unit (e.g., HFM sensor) is installed in the high-pressure part of the intake manifold (i.e., after the compressor), the dynamic precision of the measurement is good, but the component stress (e.g., by oil film contamination) is very high and the component service life is too short. If an HFM sensor is situated in the low-pressure part of the intake manifold (i.e., before the compressor) the high component strain may be largely avoided, but the dynamic signal quality is very poor because of the interposed compressor.

The present invention is based on specifying a method for model-based determination of the fresh air mass flowing into the cylinder combustion chamber of an internal combustion engine during an intake phase, which ensures sufficiently precise determination of the inflowing fresh air mass and also ensures the determination of the load even in turbocharged internal combustion engines, without the use of air mass measuring units.

The object is achieved according to the present invention by a method for model-based determination of a total fresh air mass flowing into a cylinder combustion chamber of an internal combustion engine during an intake phase, which includes ascertaining a first partial air mass on the basis of a first load partial model, the first partial load model having linear characteristics, ascertaining a second partial air mass on the basis of a second load partial model, the second load partial model having nonlinear characteristics, and determining the total fresh air mass by adding the previously ascertained partial air masses. By ascertaining the fresh air mass flowing into the cylinder combustion chamber during the intake phase using different load partial models, including a first fresh air component being ascertained via a first load partial model having purely linear functionality and a second fresh air component being ascertained via a second load partial model having nonlinear functionality, more precise acquisition of the inflowing fresh air mass and thus more precise load acquisition and load control can be obtained, in particular in turbocharged internal combustion engines. In the present invention, when reference is made to nonlinear or linear functionality or nonlinear and linear relationship, it is meant that the relationship between the fresh air mass flowing into the cylinder(s) and the intake manifold pressure existing in the intake manifold is ascertained.

The method is preferably used in turbocharged, direct-injection gasoline or diesel internal combustion engines. The inflowing fresh air mass is advantageously determined exclusively via the linear load model up to a first intake manifold pressure defined by a first intake manifold pressure threshold, particularly where $Ps1 \approx 0.52 \times Pa$; where $Pa$=exhaust gas counter pressure. The inflowing fresh air mass is first determined via a combination of the two load partial models (linear base model+nonlinear offset model) upon reaching this pressure threshold.

When determining the inflowing air mass via a combination of the two load partial models, the linear component is ascertained via the first load partial model and the nonlinear component is ascertained separately via the second load partial model, and is added onto the linear component in the form of an offset, according to a preferred embodiment of the invention.

In an especially beneficial refinement of the present invention, a third load partial model is provided, which also has nonlinear behavior, through which a third partial air mass value is ascertained. An embodiment of this type is of interest in particular in cases in which overflow of the fresh air intake occurs during the intake phase. This is the case in turbocharged internal combustion engines at certain operating points, for example. In particular, the overflow fresh air mass component is ascertained via the third load partial model, which may then be determined from a fresh air mass intake via the inlet valve, and thus allows the total fresh air mass (load) intake remaining in the cylinder to be calculated.

The method according to the present invention is preferably used in direct-injection internal combustion engines having a turbocharger.

In the following, the present invention is explained in greater detail with reference to the figures. Other objects, advantages and novel features of the present invention will become apparent from the following detailed description of the invention when considered in conjunction with the accompanying drawings.

DETAILED DESCRIPTION OF THE DRAWINGS

The exemplary method according to the present invention for model-based determination of the fresh air mass flowing into the cylinder combustion chamber of an internal combustion engine during an intake phase, includes determining a first partial air mass LM1 using a first load partial model Mod_part1, and determining a second partial air mass LM2 using a second load partial model Mod_part2. The first load partial model Mod_part1 describes a linear relationship between the fresh air mass intake LM and the intake manifold pressure $p_{intake}$ existing in the intake manifold, and the second load partial model Mod_part2 describes a nonlinear relationship.

Figure 1A:
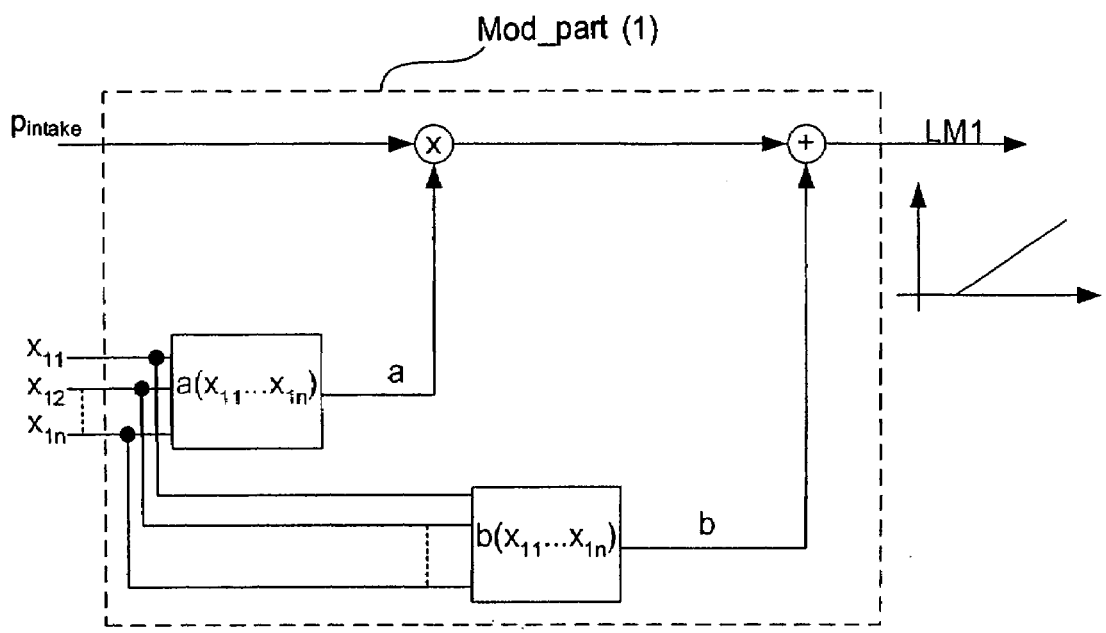
FIG. 1a: shows a schematic illustration of a load partial model for air mass or load acquisition having linear functionality, also referred to as a base model.

FIG. 1a shows an exemplary schematical diagram of the first load partial model Mod_part1 using a linear approximation (linear base model) for ascertaining the first air mass component LM1. In the linear base model, the air mass component LM1 is a linear function of the intake manifold pressure $p_{intake}$.

$$LM1 = a \times p_{intake} + b \qquad (1)$$

The linear parameters a and b may be advantageously stored in the engine controller, for example in the form of a function depending on engine speed, engine temperature, exhaust gas temperature, temperature in the intake manifold, exhaust gas, pressure, and/or the camshaft position (inlet or outlet), these parameters being referred to in the following as $x_{11}, \ldots, x_{1n}$ (a, b=f $(x_{11}, \ldots, x_{1n})$).

Figure 1B:
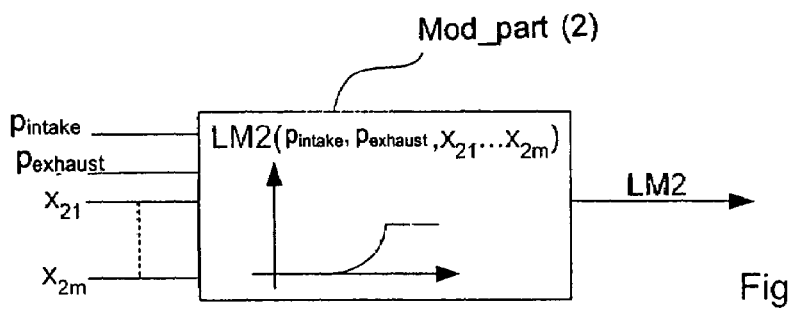
FIG. 1b: shows a schematic illustration of a load partial model for air mass or load acquisition having nonlinear functionality, also referred to as the offset model for the nonlinear load component.

FIG. 1b shows a strongly simplified illustration of the exemplary second load partial model Mod_part2. This comprises a calculation model for simulating the component LM2 of the air mass intake LM having a nonlinear relationship with the intake manifold pressure $p_{intake}$ existing in the intake manifold. The following offset component may be simulated in simplified form with the aid of the second load partial model Mod_part2:

$$LM2 = f(p_{intake}, p_{exhaust}, x_{23}, \ldots, x_{2m}) \qquad (2)$$

The offset model (Mod_part2) for the nonlinear component LM2 to determine the fresh air mass remaining in the cylinder combustion chamber after termination of the intake phase, describes the disproportionate pressure increase with increasing unthrottling. Preferably, only the offset in relation to the linear base model (Mod_part1) is ascertained here and stored in the engine controller. Some of the important input variables for the second load partial model Mod_part2 are the intake manifold pressure $p_{intake}$ ($x_{21}$) and the exhaust gas counter pressure $p_{exhaust}$ ($x_{22}$). Further important input variables include the camshaft positions (inlet, outlet), the engine temperature, the temperature in the intake manifold, the exhaust gas temperature, and/or the engine speed. The input variables of the second load partial model Mod_part2 are generally identified by $x_{21}, \ldots, x_{2m}$.

Figure 1C:
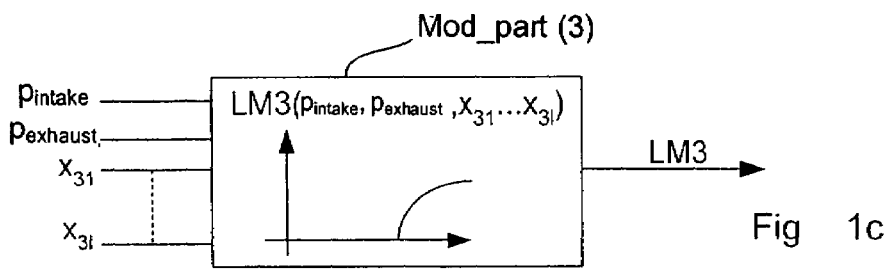
FIG. 1c: shows a load partial model for air mass acquisition of the overflow air mass component, also referred to as the offset model for overflow air mass component.

An exemplary third load partial model Mod_part3 is illustrated in FIG. 1c, which also simulates the nonlinear relationship of the air mass intake to the pressure existing in intake manifold with regard to a third partial air mass LM3. The air mass component acquired in this way may correspond to the overflow air mass taken in during the intake procedure and not remaining in the cylinder for combustion, but rather being bypassed into the exhaust gas system. In this case as well, preferably only the offset in relation to the linear base model (Mod_part1) may be ascertained and stored in the engine controller. The principal input variables for the third load partial model Mod_part3 also include the intake manifold pressure $p_{intake}$ ($x_{31}$) and the exhaust gas counter pressure $p_{exhaust}$ ($x_{32}$). Further input variables for the third load partial model Mod_part3 include the camshaft positions (inlet, outlet), the engine temperature, the temperature in the intake manifold, the exhaust gas temperature, and/or the engine speed. The input variables for the third load partial model Mod_part3 are generally identified by $x_{31}, \ldots, x_{31}$.

$$LM3 = f(p_{intake}, p_{exhaust}, x_{33}, \ldots, x_{31}) \quad (3)$$

Figure 2A:
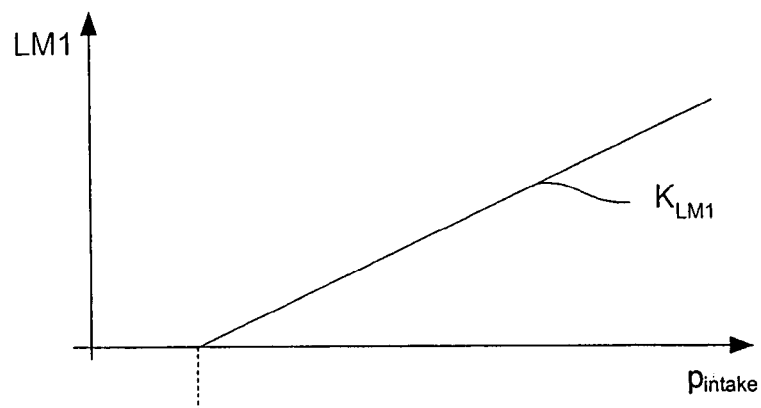
FIGS. 2a-2c: show a graph of the functional relationship between intake manifold pressure and air mass intake for the models shown in FIGS. 1a-1c respectively.
Figure 2B:
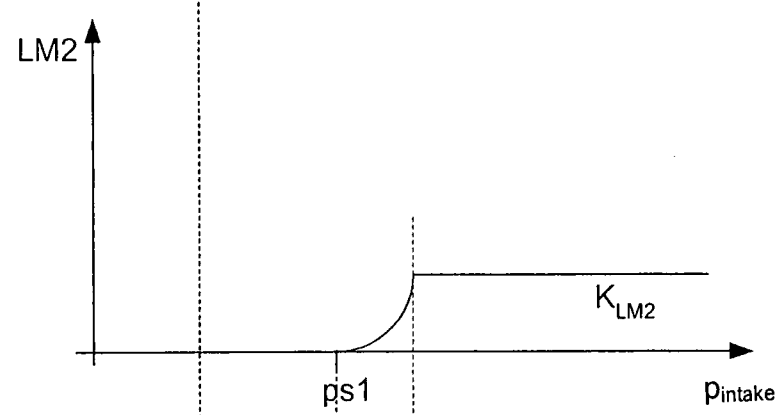
Figure 2C:
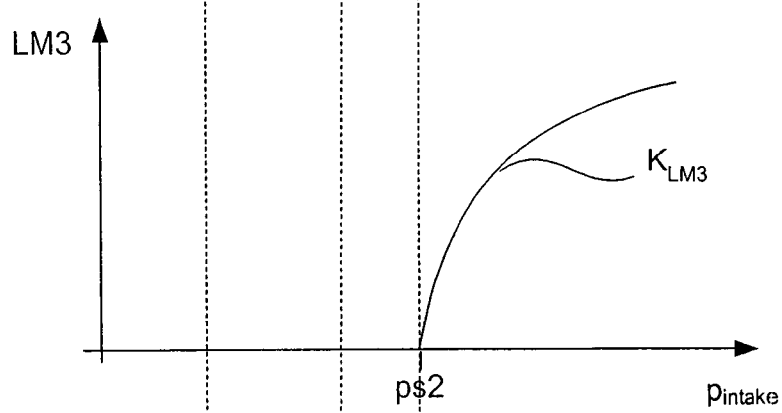
Figure 2D:
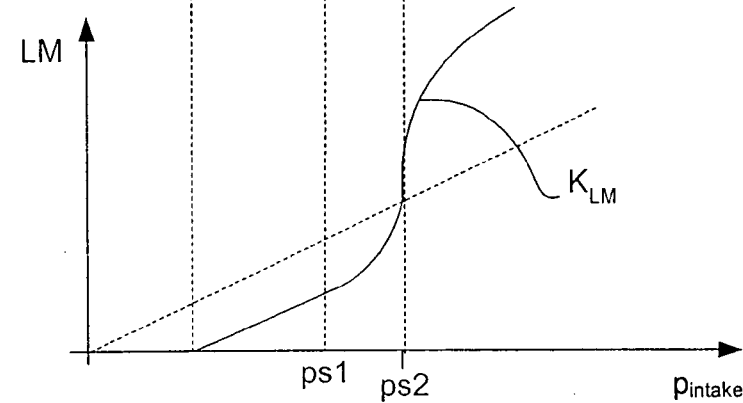
FIG. 2d: shows a graph of the functional relationship between intake manifold pressure and air mass intake based on the curves illustrated in the graphs of FIGS. 2a-2c.

The functional relationships between intake manifold pressure $p_{intake}$ and the particular air mass component (LM1, LM2, LM3), corresponding to FIGS. 1a-1c are illustrated in FIGS. 2a-2c by the characteristic curves $K_{LM1}$, $K_{LM2}$, $K_{LM3}$. Finally, the superposition of the load partial model Mod_part1 with the air mass component LM1, Mod_part2 with the air mass component (offset_1) LM2, and Mod_part3 with the air mass component (offset_2) LM3 ($K_{LM}$) are shown in FIG. 2d. The dotted line in FIG. 2d represents the linear relationship of air mass intake and intake manifold pressure without exhaust gas counter pressure and without overflow component. It may be seen clearly from the diagram of FIG. 2d that by adding the two first partial air masses LM1, LM2, the load may be derived directly such that the ascertained air mass component corresponds to the requested air mass, or load, needed for combustion. If all three partial air masses LM1, LM2, LM3 are added, a total fresh air mass increased by the overflow air mass component is ascertained. To ascertain the load, the overflow air mass component may be calculated again from the characteristic curve, in which all three partial air masses are added together.

The actual calculation of the fresh air mass remaining in the cylinder after termination of the intake phase is accordingly performed on the basis of the first two load partial models Mod_part1 and Mod_part2. This calculation may be performed online and in real time in the engine controller by addition of the partial air masses LM1 and LM2.

$$LM_{cyl} = LM1 + LM2 \quad (4)$$

$$LM_{cyl} = a(x_{11}, \ldots, x_{2n}) \times p_{intake} + b(x_{11}, \ldots, x_{1n}) + LM2(p_{intake}, p_{exhaust}, x_{23}, \ldots, x_{2m}) \quad (5)$$

The input variables of the two load partial models are either also simulated by models for this purpose or are measured via suitable sensors.

Figure 3:
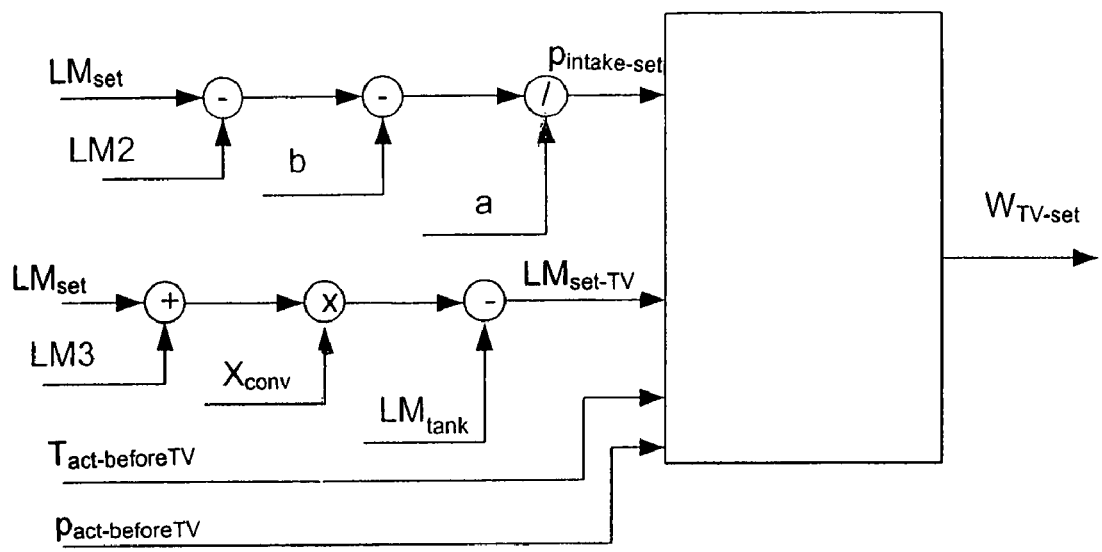
FIG. 3: shows the schematic illustration of an embodiment of a load controller in a load control model.

In particular for the actual load controller, the third load partial model or the partial load modeled thereby is of special interest. An exemplary schematic diagram for an embodiment of the load controller is illustrated in FIG. 3. The load controller may be used to convert a predefined load setpoint value (an air mass calculated on the basis of a driver command) into the setpoint manipulated variables of the actuators in such a way that the fresh air mass $LM_{cyl}$ remaining in the cylinder after an intake procedure is equal to the predefined air mass setpoint value. For the case of a turbocharged gasoline engine, in which, inter alia, a throttle valve is used for load control, the setpoint value for the throttle valve angle is thus calculated in the load controller. The setpoint value for the throttle valve angle may be calculated as a function of the variables of setpoint pressure $p_{intake-set}$ after the throttle valve, setpoint air mass flow via the throttle valve $LM_{set}$, actual pressure before the throttle valve $p_{act-beforeTV}$, and the intake manifold temperature before the throttle valve $T_{act-beforeTV}$.

$$W_{TV-set} = f(p_{intake-set}, LM_{set}, p_{act-beforeTV}, T_{act-beforeTV}) \quad (6)$$

The input variables of intake manifold temperature before the throttle valve $T_{act-beforeTV}$ and actual pressure before the throttle valve $p_{act-beforeTV}$ may also be calculated using a model or may be acquired with measurement technology using suitable sensors. The setpoint intake manifold pressure $p_{intake-set}$ after the throttle valve results from the relationship according to equation (5) already described for air mass setpoint value=air mass actual value of the air mass remaining in the cylinder ($LM_{set} = LM_{cyl}$).

$$LM_{set} = [a(x_{11}, \ldots, x_{2n}) \times p_{intake-set} + b(x_{11}, \ldots, x_{2n})] + [LM2(p_{intake-set}, p_{exhaust}, x_{23}, \ldots, x_{2m})] \quad (7)$$

Because the linear increase factor a and the linear starting value b are not themselves a function of the intake manifold pressure, it is easily possible to invert the linear load partial model. The parameters a, b already calculated for the load detection are simply used here. Since equation (7) is not solvable directly for $p_{set}$ because of its nonlinear component of the second load partial model Mod_part2, at this point, the model value still present from the preceding sampling step may preferably be used for the calculation.

In the calculation of the setpoint air mass flow $LM_{setTV}$ via the throttle valve, the entire air mass LM flowing through the inlet valve is used as a starting point. In addition to the air mass $LM_{set}$ remaining in the cylinder, the third air mass component (overflow component of the air mass intake) is also ascertained. The setpoint air mass flow through the throttle valve results using a speed-dependent conversion factor $X_{conv}$ between load and air mass flow and the tank ventilation mass flow.

$$LM_{setTV} = X_{conv} \times (LM_{set} + LM3) - LM_{tank} \quad (8)$$

The calculated value from the preceding sampling step is preferably used at this point for the third air mass component LM3. Therefore, all existing input variables are provided for calculating the setpoint value of the throttle valve angle.

The method according to the present invention is not restricted to the embodiment described. In particular, other calculation methods in the load controller may also be used, in which a calculation is not performed on the basis of the setpoint intake manifold pressure from the preceding sampling step, but rather on the basis of a current calculated value. It is an important element of the present invention that the calculation for load acquisition and/or for ascertaining the fresh air mass and the calculation for the load controller are performed on the basis of load partial models having linear characteristics (base model) and, in addition, having nonlinear characteristics (offset model). Furthermore, the exemplary method for determining the fresh air mass flowing into the cylinder combustion chamber of an internal combustion engine during an intake phase or for load control can be used in internal combustion engines having exhaust gas recirculation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for model-based determination of a total fresh air mass flowing into a cylinder combustion chamber of an internal combustion engine during an intake phase, the method comprising the acts of:
    ascertaining a first partial air mass on the basis of a first load partial model, the first load partial model having linear characteristics;
    ascertaining a second partial air mass on the basis of a second load partial model, the second load partial model having nonlinear characteristics; and
    determining the total fresh air mass by adding the previously ascertained first and second partial air masses.

2. The method according to claim 1, wherein
    the first partial air mass is ascertained exclusively by the first load partial model until reaching a first intake manifold pressure threshold.

3. The method according to claim 2, wherein
    the second partial air mass is ascertained upon reaching the first intake manifold pressure threshold.

4. The method according to claim 3, further comprising the acts of:
    ascertaining a third partial air mass on the basis of a third load partial model, the third load partial model having a nonlinear behavior.

5. The method according to claim 4, wherein
    the third partial air mass is ascertained upon reaching a second intake manifold pressure threshold.

6. The method according to claim 1, further comprising the acts of:
    ascertaining a third partial air mass on the basis of a third load partial model, the third load partial model having a nonlinear behavior.

7. The method according to claim 6, wherein
    the third partial air mass is ascertained upon reaching a second intake manifold pressure threshold.

8. The method according to claim 4, wherein
    an overflow air mass component occurring in the event of an overflow procedure of the cylinder combustion chamber is ascertained via the third load partial model.

9. A method for model-based load control for a turbocharged internal combustion engine having direct injection, in which a predefined load setpoint value is converted into setpoint manipulated variables for actuators to influence the air mass flow into a cylinder combustion chamber thereof so that a total fresh air mass present therein after termination of an intake phase is equal to the predefined load setpoint value, wherein
    a first partial air mass is ascertained using a first load partial model having linear characteristics, a second partial air mass is ascertained using a second load partial model having nonlinear characteristics, and a third partial air mass, occurring during an overflow procedure, is ascertained using a third load partial model, having nonlinear characteristics.

10. The method according to claim 9, wherein
    a setpoint intake manifold pressure is calculated on the basis of the first load partial model and the second load partial model.

11. The method according to claim 9,
    wherein a setpoint air mass flow through a throttle valve is calculated on the basis of the third partial air mass calculated in a preceding sampling step.

12. The method according to claim 11, wherein
    the setpoint air mass through the throttle valve is calculated on the basis of the third load partial model.

13. An internal combustion engine controller for executing instructions to influence air mass flow into a cylinder combustion chamber, the instructions comprising:
    computing a first partial air mass using a first load partial model having linear characteristics;
    computing a second partial air mass using a second load partial model having nonlinear characteristics; and
    determining a total fresh air mass by adding the first and second partial air masses.

14. The internal combustion engine controller according to claim 13, further comprising instructions to compute the second partial air mass beginning at a first intake manifold pressure threshold.

15. The internal combustion engine controller according to claim 13, further comprising instructions to calculate a setpoint intake manifold pressure using the first load partial model and the second load partial model.

16. The internal combustion engine controller according to claim 13, further comprising instructions for computing a turbocharger bypass air mass using a third load partial model having nonlinear characteristics.

17. The internal combustion engine controller according to claim 13, further comprising instructions to convert a predefined load setpoint value into setpoint manipulated variables for actuators to influence the air mass flow into the cylinder combustion chamber thereof, such that a total fresh air mass present therein after termination of an intake phase is substantially equal to the predefined load setpoint value.

18. The internal combustion engine controller according to claim 13, further comprising instructions for computing a third partial air mass using a third load partial model having nonlinear characteristics, the third partial air mass corresponding to an overflow air mass, and adding the third partial air mass to determine the total fresh air mass.

19. The internal combustion engine controller according to claim 18, further comprising instructions to compute the third partial air mass beginning at a second intake manifold pressure threshold.

20. The internal combustion engine controller according to claim 18, further comprising instructions for generating setpoint manipulated variables for actuators to influence the air mass flow into the cylinder combustion chamber such that a predefined load setpoint value substantially equals the total fresh air mass.

* * * * *